United States Patent
Yang

(10) Patent No.: US 7,079,159 B2
(45) Date of Patent: Jul. 18, 2006

(54) MOTION ESTIMATION APPARATUS, METHOD, AND MACHINE-READABLE MEDIUM CAPABLE OF DETECTING SCROLLING TEXT AND GRAPHIC DATA

(75) Inventor: Seung-joon Yang, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 142 days.

(21) Appl. No.: 10/686,737

(22) Filed: Oct. 17, 2003

(65) Prior Publication Data

US 2004/0101047 A1     May 27, 2004

(30) Foreign Application Priority Data

Nov. 23, 2002    (KR)   ....................... 10-2002-0073330

(51) Int. Cl.
     *G09G 5/00*         (2006.01)
     *H04N 7/12*         (2006.01)
     *H04N 11/02*       (2006.01)
     *H04N 11/04*       (2006.01)

(52) U.S. Cl. ....................... 345/684; 345/681; 345/683; 375/240.16

(58) Field of Classification Search ........ 345/681–689; 375/240.16
    See application file for complete search history.

(56) References Cited

U.S. PATENT DOCUMENTS

| | | | | |
|---|---|---|---|---|
| 5,153,719 A | * | 10/1992 | Ibenthal | .................. 348/699 |
| 5,828,423 A | * | 10/1998 | Serizawa et al. | .......... 348/699 |
| 6,271,824 B1 | * | 8/2001 | Chang | ........................ 345/685 |
| 6,389,075 B1 | * | 5/2002 | Wang et al. | ........... 375/240.16 |
| 6,809,758 B1 | * | 10/2004 | Jones | .................... 348/208.99 |
| 2004/0070686 A1 | * | 4/2004 | Jung et al. | ................. 348/448 |
| 2004/0075764 A1 | * | 4/2004 | Law et al. | .................. 348/448 |
| 2004/0105029 A1 | * | 6/2004 | Law et al. | .................. 348/448 |

FOREIGN PATENT DOCUMENTS

EP       1 117 251       7/2001

OTHER PUBLICATIONS

Seungjoon Yang et al., "Pattern Matching Assisted Motion Estimation and Motion Vector Histogram Analysis for Interlaced-to-Progressive Conversion", Proceedings 2002 International Conference.

Kalevo et al., "Motion Compensated Deinterlacing", Consumer Electronics, Digest of Technical Papers, IEEE 1993, Jun. 8, 1993, pp. 40-41.

Communication including Search Report from the European Patent Office dated Jun. 29, 2004 for the corresponding European patent application.

Chinese Office Action issued Jun. 17, 2005 in corresponding Application No. 200310116530.4.

* cited by examiner

*Primary Examiner*—Michael Razavi
*Assistant Examiner*—Eric Woods

(57) ABSTRACT

A motion estimation apparatus, method, and machine-readable medium capable of detecting scrolling text or graphic data, which can provide information of whether text or graphic data scrolling in a horizontal direction on a screen exists and information related thereto.

23 Claims, 3 Drawing Sheets

MOTION ESTIMATION APPARATUS, METHOD, AND MACHINE-READABLE MEDIUM CAPABLE OF DETECTING SCROLLING TEXT AND GRAPHIC DATA

CROSS-REFERENCE TO RELATED APPLICATIONS

This application claims the benefit of Korean Application No. 10-2002-73330, which was filed on Nov. 23, 2002, in the Korean Intellectual Property Office, the disclosure of which is incorporated herein by reference.

BACKGROUND OF THE INVENTION

1. Field of the Invention

The present invention relates to a motion estimation apparatus and a method thereof, and, more particularly, to a motion estimation apparatus and a method thereof capable of detecting scrolling text and graphic data in a horizontal direction on a screen.

2. Description of the Related Art

There exist the interlaced scan mode and the progressive scan mode for scan modes for a video display device. The interlaced scan mode is used for general TVs and so on, and refers to a mode that, when one image is displayed, divides one frame image into two fields and sequentially displays the two fields one after the other, whereas the progressive scan mode is used for computer monitors, digital TVs, and so on, and refers to a mode that displays at a time entire frames with one image frame processed as a unit frame just like a film is projected on a screen.

As more video display devices of progressive scan mode are used and, at the same time, the necessity of data exchanges among devices using different scan modes grows, the importance is placed more than ever before on the interlaced-to-progressive conversion (IPC) method that converts the interlaced scan mode into the progressive scan mode. Therefore, IPC methods having a far more enhanced performance are required to obtain images of better quality.

There exist diverse methods for interlaced-to-progressive conversions. As basic methods, there are an intra-field IPC method that inserts average data of two-line data between two lines of a current field to implement a new field, and an inter-field IPC method having no motion compensation that inserts between lines of a current field average data of data ahead of and behind the current field to implement one frame. Such IPC methods are easily implemented, but cannot achieve a satisfactory image quality. Accordingly, a motion-compensated IPC method has been proposed that divides an image into plural blocks with respect to time-continuous field data with reference to current field data, obtains motions for the respective blocks, and interpolates a current frame image with reference to vectors of the motions. A motion-adaptive IPC method has been also proposed that estimates the extent of motions and interpolates frames based on the motions, and so on. Such IPC methods can obtain an image quality better than the basic methods, but have relatively more complicated hardware.

However, the IPC methods are not suitable for displays of text or graphic data such as news, programs, stock prices, whether, and so on, with horizontal scrolling at the bottom of a screen, and so on. That is, due to the characteristics of scrolling text or graphic data, in case that the intra-field IPC method or the intra-field IPC method is used, text in interpolated images is not clearly displayed, and displays broken letters on many occasions. Further, in case of scrolling text or graphic data, because plural lines move on the screen in the horizontal direction at a certain speed, image interpolations can be easily implemented if there is information of whether scrolling text or graphic data exists and a scrolling speed, so that excellent image interpolations in terms of performance or speed become possible without the use of a complicated algorithm such as the motion-compensated IPC method or the motion-adaptive IPC method.

Therefore, a motion estimation apparatus and a method applicable to IPC methods and the like become necessary for detecting whether text or graphic data scrolling in the horizontal direction of a screen exists and proving information necessary for image interpolations.

SUMMARY OF THE INVENTION

Accordingly, it is an aspect of the present invention to provide a motion estimation apparatus and a method capable of detecting whether text or graphic data scrolling in the horizontal direction of a screen exists, and providing information necessary for image interpolations.

Additional aspects and advantages of the invention will be set forth in part in the description which follows and, in part, will be obvious from the description, or may be learned by practice of the invention.

In order to achieve the above aspect, a motion estimation apparatus according to the present invention comprises a line-wise motion estimation unit for calculating motion vectors indicating the extent of motions in a horizontal direction for individual lines of a predetermined search area with reference to a current field/frame and a reference field/frame; a motion vector buffer for storing motion vectors for the individual lines; a scroll detection unit for determining whether scroll motions exist in the current field/frame based on the motion vectors for the individual lines which are stored in the motion vector buffer; and a scroll line detection unit for determining whether the scroll motions exist in the individual lines of the search area, based on a result of the determination of the scroll detection unit.

The line-wise motion estimation unit includes a pixel buffer for sequentially storing pixel data constructing lines to calculate the motion vectors in the reference field/frame; a FIFO buffer for sequentially storing pixel data constructing lines to calculate the motion vectors in the current field/frame; an SAD buffer for calculating and storing summed absolute difference (SAD) values based on estimations of the extent of motions, using the pixel data respectively stored in the pixel buffer and the FIFO buffer; and a motion vector estimator for calculating the motion vectors based on the SAD values stored in the SAD buffer. In here, it is possible that the motion vector estimator calculates the motion vectors in correspondence to a motion estimation position having the minimum value of the SAD values stored in the SAD buffer.

The motion estimation apparatus further comprises a motion detector for determining the validity of the motion vectors calculated by the motion vector estimator; and an output selector for selectively outputting only selected motion vectors based on a result of the validity decision of the motion detector. At this time, the motion estimator determines that the motion vectors are valid if a difference between the maximum value and the minimum value of the SAD values stored in the SAD buffer is larger than a predetermined threshold value.

The scroll detection unit calculates the number of occurrences by magnitudes of the motion vectors stored in the motion vector buffer, and determines that the scroll motions exist when motion vectors of certain magnitudes are determined to be more than the predetermined number of occurrences. Further, the scroll line detection unit may decide that the scroll motions exist in corresponding lines when motion vectors calculated line by line correspond to the magnitudes of motion vectors are determined to be more than the predetermined number of occurrences.

In the meantime, a motion estimation method according to the present invention comprises (a) calculating motion vectors indicating the extent of motions in a horizontal direction for individual lines of a predetermined search area with reference to a current field/frame and a reference field/frame; (b) storing motion vectors for the individual lines; (c) determining whether scroll motions exist in the current field/frame based on the stored motion vectors for the individual lines; and (d) determining whether the scroll motions exist in the individual lines of the search area, based on a result of the decision of the step(c).

Operation (a) further comprises (a1) sequentially storing pixel data constructing lines to calculate the motion vectors in the reference field/frame; (a2) sequentially storing pixel data to calculate the motion vectors in the current field/frame; (a3) calculating and storing summed absolute difference(SAD) values based on estimations of the extent of motions, using the pixel data respectively stored in operations(a1) and (a2); and (a4) calculating the motion vectors based on the stored SAD values. In here, it is possible that operation(a4) calculates the motion vectors in correspondence to a motion estimation position having the minimum value of the stored SAD values.

The motion estimation method further comprises determining the validity of the motion vectors calculated in operation(a4); and selectively outputting only valid motion vectors based on a result of the validity determination. At this time, the determining the validity determines the motion vectors as valid if a difference between the maximum value and the minimum value of the SAD values stored in the SAD buffer is larger than a predetermined threshold value.

Operation (c) calculates the number of occurrences by magnitudes of the stored motion vectors, and determines that the scroll motions exist when motion vectors of certain magnitudes are determined to be more than the predetermined number of occurrences. Further, operation(d) may determines that the scroll motions exist in corresponding lines are determined to be motion vectors calculated line by line corresponds to the magnitudes of motion vectors detected more than the predetermined number of occurrences.

BRIEF DESCRIPTION OF THE DRAWINGS

These and other aspects and/or advantages of the present invention will become apparent and more readily appreciated from the following description of the preferred embodiments, taken in conjunction with the accompanying drawings of which.

DETAILED DESCRIPTION OF THE PREFERRED EMBODIMENTS

Figure 1:
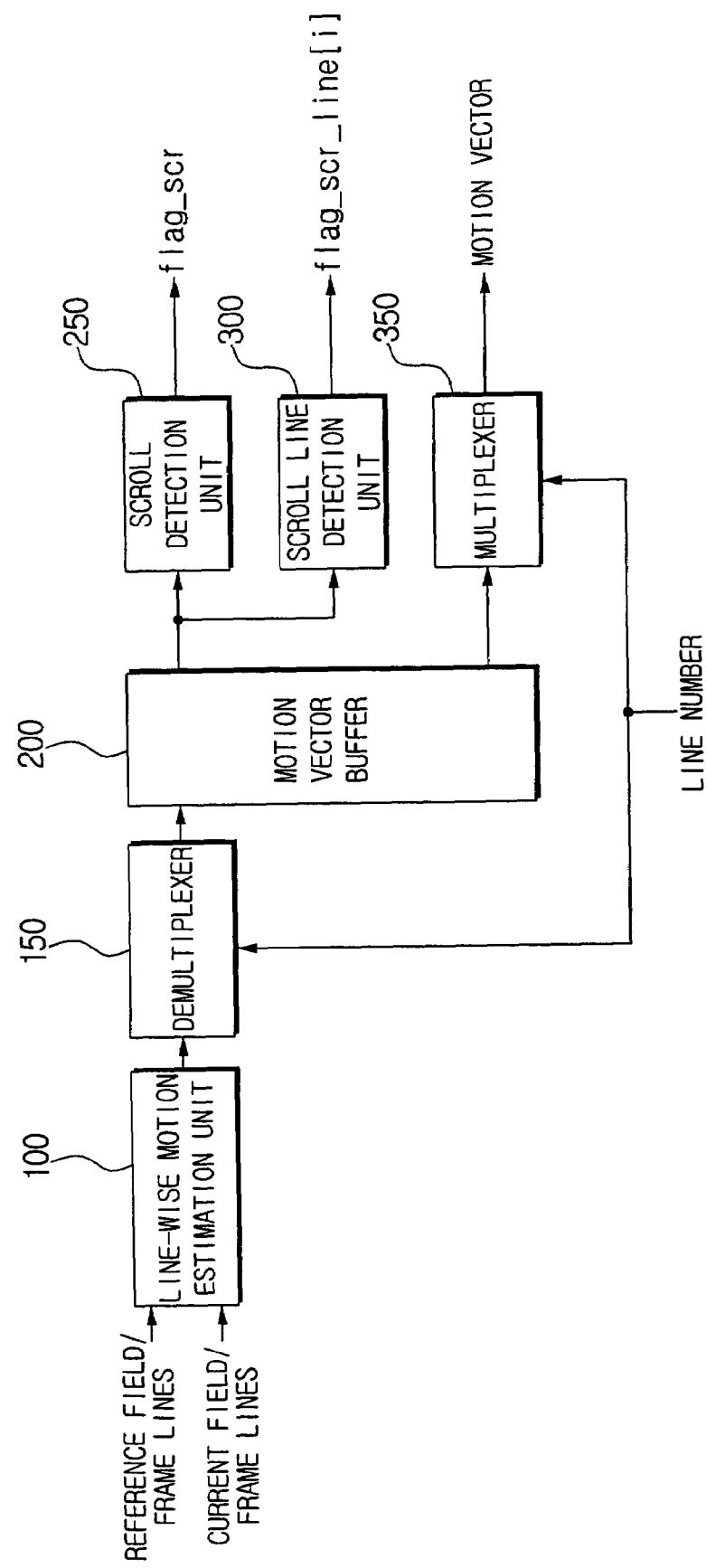
FIG. 1 is a block diagram for showing a motion estimation apparatus, according to an embodiment of the present invention.

Reference will now be made in detail to the embodiments of the present invention, examples of which are illustrated in the accompanying drawings, wherein like reference numerals refer to the like elements throughout.

FIG. 1 is a block diagram for showing a motion estimation apparatus according to an embodiment of the present invention. The motion estimation apparatus includes a line-wise motion estimation unit 100, a demultiplexer 150, a motion vector buffer 200, a scroll detection unit 250, a scroll line detection unit 300, and a multiplexer 350.

The line-wise motion estimation unit 100 calculates motion vectors indicating motions in a horizontal direction with reference to lines of inputted reference field/frame and current field/frame. In here, the reference field/frame denotes a reference field or a reference frame, and the current field/frame denotes a current field or a current frame.

The motion vector buffer 200 stores motion vectors estimated in the line-wise motion estimation unit 100 with respect to individual lines. At this time, the demultiplexer 150 stores corresponding motion vectors at positions allocated in the motion vector buffer 200 to the respective lines based on inputted line number information.

The scroll detection unit 250 determines whether there exist scroll motions of text, graphic data, or the like in a horizontal direction in a current field/frame based on the motion vectors stored in the motion vector buffer 200. Further, the scroll line detection unit 300 determines whether there exist scroll motions with respect to individual lines in case that the scroll motions exist in the current field/frame.

Figure 2:
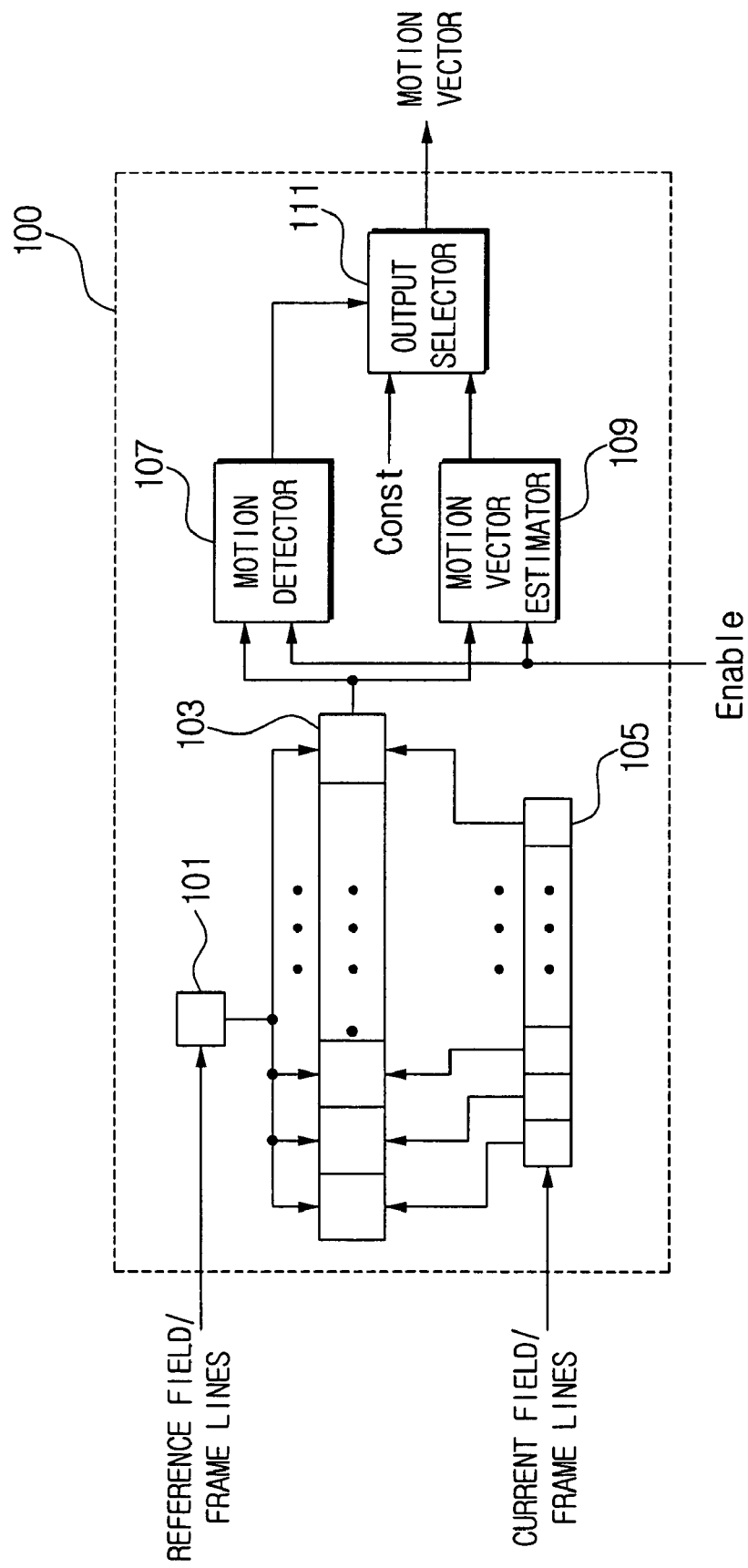
FIG. 2 is a block diagram for showing a line-wise motion estimation unit of FIG. 1.

FIG. 2 is a block diagram for showing in detail the line-wise motion estimation unit 100 of FIG. 1.

In FIG. 2, the motion estimation unit 100 is constructed with a pixel buffer 101, an SAD buffer 103, an FIFO buffer 105, an motion detector 107, a motion vector estimator 109, and an output selector 111.

The pixel buffer 101 sequentially inputs and stores pixels forming lines for which motion vectors are calculated in a reference field/frame. The FIFO buffer 105 sequentially inputs and stores pixels forming lines for which motion vectors are calculated in a current field/frame. The SAD buffer 103 stores summed absolute difference (SAD) values calculated by using pixel data stored in the pixel buffer 101 and the FIFO buffer 105. The motion vector estimator 109 calculates motion vectors from the SAD values stored in the SAD buffer 103. The motion detector 107 determines the validity of estimated motion vectors. Further, the output selector 111 outputs motion vectors determined to be valid based on the validity decision. If decided as invalid motion vectors, a certain constant const can be outputted to notify of invalidity.

Figure 3:
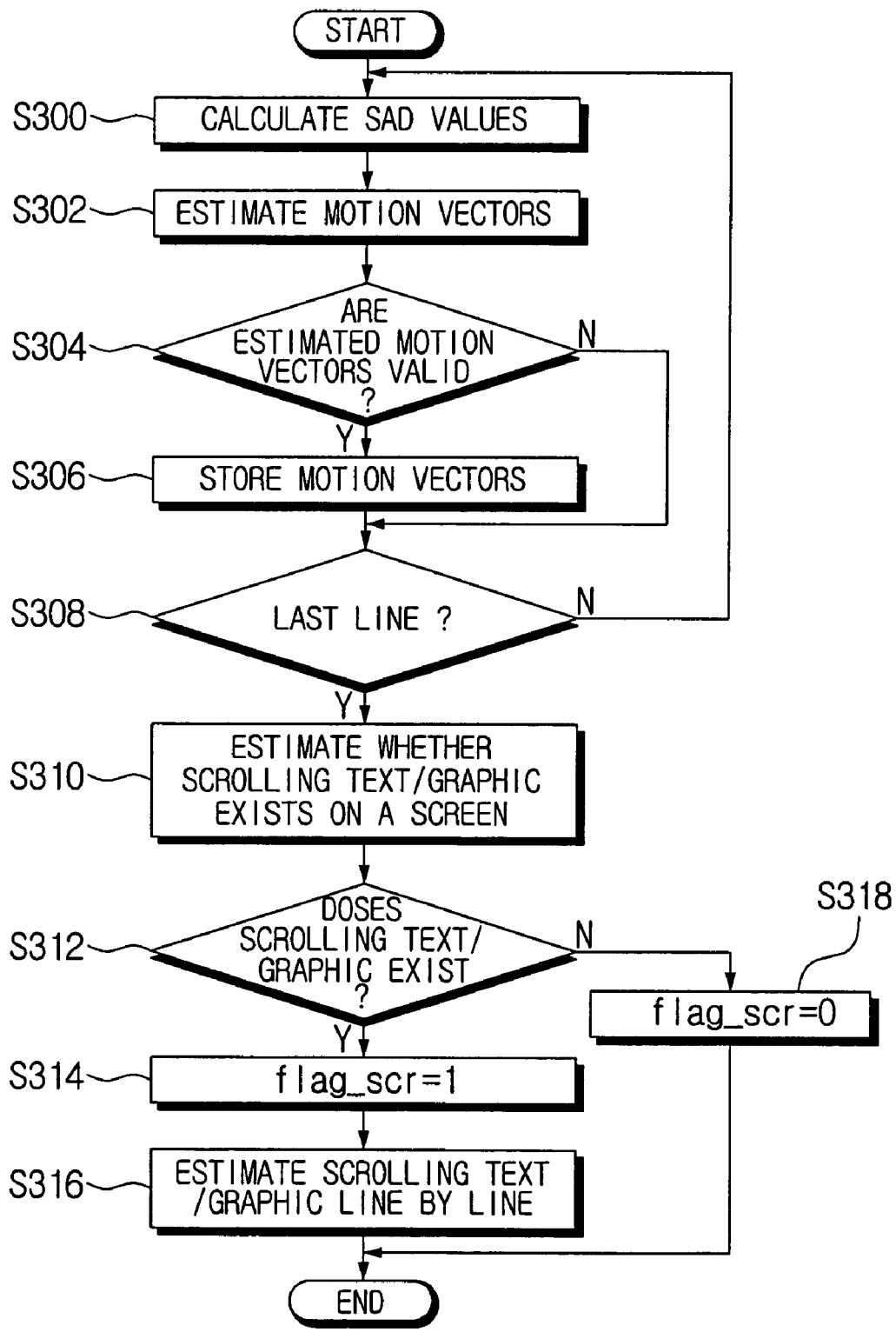
FIG. 3 is a flow chart for explaining an operation process for a motion estimation apparatus, according to an embodiment of the present invention.

FIG. 3 is a flow chart for explaining an operation process for a motion estimation apparatus according to an embodiment of the present invention.

In the operation process of FIG. 3, first, the line-wise motion estimation unit 100 calculates an SAD value with respect to the $i^{th}$ line in a specified search area based on a reference field/frame and a current field/frame (S300). In general, since scrolling text or graphic data exists at the bottom of a screen, it is possible to enhance a processing speed by properly setting a search area instead of calculating SAD values over the entire field/frame.

SAD values in a search area are calculated through a process as below. First, the pixel buffer 121 stores pixel data constructing the $i^{th}$ line of a reference field/frame, and the FIFO buffer 125 stores pixel data constructing the $i^{th}$ line of a current field/frame. The pixel data for the reference field/frame and the current field/frame are sequentially inputted and stored till an SAD value for the $i^{th}$ line is completely calculated. The calculated SAD value is stored at a corresponding position in the SAD buffer 103. The SAD value is calculated from following Formula 1.

$$\Phi(i, v) = \sum_{j=0}^{N-1} |f_{ref}(i, j-v) - f_{cur}(i, j+1)| \qquad \text{Formula 1}$$

In here, $f_{ref}(i,j-v)$ denotes pixel data positioned at a j–v column of the $i^{th}$ line in a reference field/frame, and $f_{cur}(i, j+v)$ pixel data positioned at a j+v column of the $i^{th}$ line in a current field/frame. As shown in Formula 1, an SAD value is calculated with v value changes, and the v corresponds to a motion estimation position.

If the calculation of the SAD value for the $i^{th}$ line is completed through the above process, the motion vector estimator 109 estimates as the motion vector a position having the minimum value out of the SAD values stored in the SAD buffer 103 (S302). This is expressed in Formula 2 as below.

$$V = \arg\min \Phi(i,v) \qquad \text{Formula 2}$$

The motion detector 107 determines the validity of a motion vector v estimated from the minimum and maximum values out of the SAD values stored in the SAD buffer 103 (S304). The motion vector is determined to be valid if a difference between the minimum and maximum values of the SAD values is larger than a predetermined first threshold value Th1 as shown in Formula 3 as below. Otherwise the motion vector is determined to be invalid.

IF(max $\Phi((i,v)$–min $\Phi(i,v))$>$Th$1, the estimated
motion vector is valid; ELSE the estimated
motion vector is invalid.  Formula 3

The output selector 111 outputs a motion vector decided to be valid in the motion detector 107, and stores the motion vector at a corresponding position of the motion vector buffer 200 (S306). In this case, if the estimated motion vector is not valid, it may be possible that the output selector 111 outputs a certain constant const to be stored. This may be expressed in Formula 4 as below.

vscr[i]=V  Formula 4 in the above Formula 4, i denotes a line number, and vscr[i] a buffer allocated in the motion vector buffer 200 with respect to respective lines.

After a motion vector for the $i^{th}$ line is stored, it is decided whether the $i^{th}$ line is the last line of an area set as a search area (S308), and, if the $i^{th}$ line is not the last line, the above process is repeated up to the last line of the search line.

The scroll detection unit 250 estimates whether there exists on a current field/frame view a scroll motion of text, graphic data, or the like from the motion vectors stored in the motion vector buffer 200 (S310). The estimation of whether there exists the scroll motion of text, graphic data, or the like follows a process as below.

First, the scroll detection unit 250 calculates the number of occurrences by magnitude with respect to motion vectors V stored in the motion vector buffer 200, and, if a predetermined number of occurrences of motion vectors of certain magnitude appears, decides that the scroll motion exists.

That is, In case that scrolling text or graphic data exists, some lines move in the horizontal direction at the same speed, so that a certain number of motion vectors of the same magnitude exist.

Through the above process, it is decided that there exist a scroll motion on a current field/frame, the scroll detection unit 250 outputs a "1" as a scroll flag signal flag_scr (S312 and S314), and, otherwise, outputs a "0" for the scroll flag signal flag_scr (S312 and S314). This is expressed in Formula 5 as below.

IF max $hist[V]$>$Th$2, flag_scr=1 ELSE flag_scr=0  Formula 5

In here, hist[V] denotes a histogram for motion vectors, and Th2 a predetermined second threshold value. The scroll flag signal flag_scr outputted from the scroll detection unit 250 may be used as a signal for external devices that indicates whether the scroll motion exists.

The scroll line detection unit 300 estimates whether scrolling text or graphic data exists line by line in a search area in case that the scrolling text or graphic data exists (S316).

The decision on the scroll motion for each line is made by whether the motion vector estimated line by line corresponds to a motion vector over the certain number of occurrences used when the scroll detection unit 250 determines whether the scroll motion exists. If it is decided that scrolling text or graphic data is included in a corresponding line through such a determination process, the scroll line detection unit 300 outputs "1" for a corresponding scroll line flag flag_scr_line[i], and, otherwise, outputs a "0" for the corresponding scroll line flag flag_scr_line[i]. Such a process is carried out for all the lines in a search area, so it is determined whether scroll motions exist line by line.

The motion vectors, scroll flag flag_scr, and scroll line flag flag_scr_line[i] calculated by the above process may be used for IPC methods. For example, as to an area in which scroll motions exists, information such as the motion vectors, scroll flag flag_scr, and scroll line flag flag_scr_line[i] calculated by the above process is used for image interpolations, and, for other areas, an IPC method of appropriate mode is used for image interpolations. Through such a process, better quality images and an improved processing speed can be obtained, compared to a case that image interpolations are carried out without consideration of scrolling text or graphic data.

As described above, the present invention can detect by a relatively simple method whether text or graphic data scrolling in a horizontal direction on a screen exists. Further, the present invention also provides information, such as motion vectors and the like, which is related to scrolling text or graphic data and can be used for image interpolations, enabling image interpolations advantageous in aspects of improvements of image quality and processing speed.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be understood by those skilled in the art that various changes in form and details may be made therein without departing from the spirit and scope of the present invention as defined by the appended claims and their equivalents.

What is claimed is:

1. A motion estimation apparatus, comprising:
    a line-wise motion estimation unit for calculating motion vectors indicating the extent of motions in a horizontal direction for individual lines of a predetermined search area with reference to a current field/frame and a reference field/frame;
    a motion vector buffer for storing motion vectors for the individual lines;
    a scroll detection unit for determining whether scroll motions exist in the current field/frame based on the motion vectors for the individual lines which are stored in the motion vector buffer;
    a scroll line detection unit for determining whether the scroll motions exist in the individual lines of the search area, based on a result of the determination of the scroll detection unit; and
    a demultiplexer to store corresponding motion vectors at positions allocated in the motion vector buffer to respective lines based on inputted line number information.

2. The motion estimation apparatus as claimed in claim 1, wherein the line-wise motion estimation unit includes:
    a pixel buffer for sequentially storing pixel data constructing lines to calculate the motion vectors in the reference field/frame;
    a FIFO buffer for sequentially storing pixel data constructing lines to calculate the motion vectors in the current field/frame;
    an SAD buffer for calculating and storing summed absolute difference (SAD) values based on estimations of the extent of motions, using the pixel data respectively stored in the pixel buffer and the FIFO buffer; and
    a motion vector estimator for calculating the motion vectors based on the SAD values stored in the SAD buffer.

3. The motion estimation apparatus as claimed in claim 2, wherein the motion vector estimator calculates the motion vectors in correspondence to a motion estimation position having the minimum value of the SAD values stored in the SAD buffer.

4. The motion estimation apparatus as claimed in claim 2, further comprising:
    a motion detector for determining the validity of the motion vectors calculated by the motion vector estimator; and
    an output selector for selectively outputting only selected motion vectors based on a result of the validity decision of the motion detector.

5. The motion estimation apparatus as claimed in claim 4, wherein the motion estimator determines that the motion vectors are valid if a difference between the maximum value and the minimum value of the SAD values stored in the SAD buffer is larger than a predetermined threshold value.

6. A motion estimation apparatus, comprising:
    a line-wise motion estimation unit for calculating motion vectors indicating the extent of motions in a horizontal direction for individual lines of a predetermined search area with reference to a current field/frame and a reference field/frame;
    a motion vector buffer for storing motion vectors for the individual lines;
    a scroll detection unit for determining whether scroll motions exist in the current field/frame based on the motion vectors for the individual lines which are stored in the motion vector buffer; and
    a scroll line detection unit for determining whether the scroll motions exist in the individual lines of the search area, based on a result of the determination of the scroll detection unit,
    wherein the scroll detection unit calculates a number of occurrences of a plurality of magnitudes of the motion vectors stored in the motion vector buffer, and determines that the scroll motions exist when motion vectors of certain magnitudes are determined to be more than a predetermined number of occurrences.

7. The motion estimation apparatus as claimed in claim 6, wherein the scroll line detection unit determines that the scroll motions exist in corresponding lines when motion vectors, calculated line by line, correspond to the magnitudes of motion vectors determined to be more than the predetermined number of occurrences.

8. A motion estimation method, comprising:
    (a) calculating motion vectors indicating the extent of motions in a horizontal direction for individual lines of a predetermined search area with reference to a current field/frame and a reference field/frame;
    (b) storing motion vectors for the individual lines;
    (c) determining whether scroll motions exist in the current field/frame based on the stored motion vectors for the individual lines;
    (d) determining whether the scroll motions exist in the individual lines of the search area, based on a result of the determination of operation (c); and
    (e) storing corresponding motion vectors at positions allocated to respective lines based on inputted line number information.

9. The motion estimation method as claimed in claim 8, wherein operation (a) further comprises:
    (a1) sequentially storing pixel data constructing lines to calculate the motion vectors in the reference field/frame;
    (a2) sequentially storing pixel data to calculate the motion vectors in the current field/frame;
    (a3) calculating and storing summed absolute difference (SAD) values based on estimations of the extent of motions, using the pixel data respectively stored in the operations (a1) and (a2); and
    (a4) calculating the motion vectors based on the stored SAD values.

10. The motion estimation method as claimed in claim 9, wherein the operation (a4) calculates the motion vectors in correspondence to a motion estimation position having the minimum value of the stored SAD values.

11. The motion estimation method as claimed in claim 9, further comprising:
    determining the validity of the motion vectors calculated in the operation (a4); and
    selectively outputting only valid motion vectors based on a result of the validity determination.

12. The motion estimation method as claimed in claim 11, wherein the determining the validity determines the motion vectors as valid if a difference between the maximum value and the minimum value of the SAD values stored in a SAD buffer is larger than a predetermined threshold value.

13. A motion estimation method, comprising:
(a) calculating motion vectors indicating the extent of motions in a horizontal direction for individual lines of a predetermined search area with reference to a current field/frame and a reference field/frame;
(b) storing motion vectors for the individual lines;
(c) determining whether scroll motions exist in the current field/frame based on the stored motion vectors for the individual lines; and
(d) determining whether the scroll motions exist in the individual lines of the search area, based on a result of the determination of operation (c),
wherein operation (c) calculates the number of occurrences of a plurality of magnitudes of the stored motion vectors, and determines that the scroll motions exist when motion vectors of certain magnitudes are determined to be more than a predetermined number of occurrences.

14. The motion estimation method as claimed in claim 13, wherein operation (d) determines that the scroll motions exist in corresponding lines when motion vectors, calculated line by line, correspond to the magnitudes of motion vectors determined to be more than the predetermined number of occurrences.

15. The motion estimation apparatus of claim 4, wherein, if the motion detector determines that a motion vector is invalid, the output selector outputs a constant to indicate invalidity.

16. The motion estimation method of claim 11, further comprising:
if a motion vector is invalid, outputting a constant to indicate invalidity.

17. A machine-readable medium that provides instructions, which, when executed by a machine, cause the machine to perform motion estimation operations comprising:
(a) calculating motion vectors indicating the extent of motions in a horizontal direction for individual lines of a predetermined search area with reference to a current field/frame and a reference field/frame;
(b) storing motion vectors for the individual lines;
(c) determining whether scroll motions exist in the current field/frame based on the stored motion vectors for the individual lines;
(d) determining whether the scroll motions exist in the individual lines of the search area, based on a result of the determination of operation (c); and
storing corresponding motion vectors at positions allocated to respective lines based on inputted line number information.

18. The machine-readable medium of claim 17, wherein the instructions cause the machine to perform motion estimation operations further comprising:
(a1) sequentially storing pixel data constructing lines to calculate the motion vectors in the reference field/frame;
(a2) sequentially storing pixel data to calculate the motion vectors in the current field/frame;
(a3) calculating and storing summed absolute difference (SAD) values based on estimations of the extent of motions, using the pixel data respectively stored in operations (a1) and (a2); and
(a4) calculating the motion vectors based on the stored SAD values.

19. The machine-readable medium of claim 18, wherein operation (a4) calculates the motion vectors in correspondence to a motion estimation position having the minimum value of the stored SAD values.

20. The machine-readable medium of claim 18, wherein the instructions cause the machine to perform motion estimation operations further comprising:
determining the validity of the motion vectors calculated in operation (a4); and
selectively outputting only valid motion vectors based on a result of the validity determination.

21. The machine-readable medium of claim 20, wherein the determining the validity determines the motion vectors as valid if a difference between the maximum value and the minimum value of the SAD values stored in a SAD buffer is larger than a predetermined threshold value.

22. A machine-readable medium, that provides instructions, which, when executed by a machine, cause the machine to perform motion estimation operations comprising:
(a) calculating motion vectors indicating the extent of motions in a horizontal direction for individual lines of a predetermined search area with reference to a current field/frame and a reference field/frame;
(b) storing motion vectors for the individual lines;
(c) determining whether scroll motions exist in the current field/frame based on the stored motion vectors for the individual lines; and
(d) determining whether the scroll motions exist in the individual lines of the search area, based on a result of the determination of operation (c),
wherein operation (c) calculates a number of occurrences of a plurality of magnitudes of the stored motion vectors, and determines that the scroll motions exist when motion vectors of certain magnitudes are determined to be more than a predetermined number of occurrences.

23. The machine-readable medium of claim 22, wherein operation (d) determines that the scroll motions exist in corresponding lines when motion vectors calculated line by line corresponds to the magnitudes of motion vectors are determined to be more than a predetermined number of occurrences.

* * * * *